Feb. 24, 1959 R. D. COOKSLEY 2,874,631
CHARCOALER
Filed Feb. 14, 1956 2 Sheets-Sheet 2
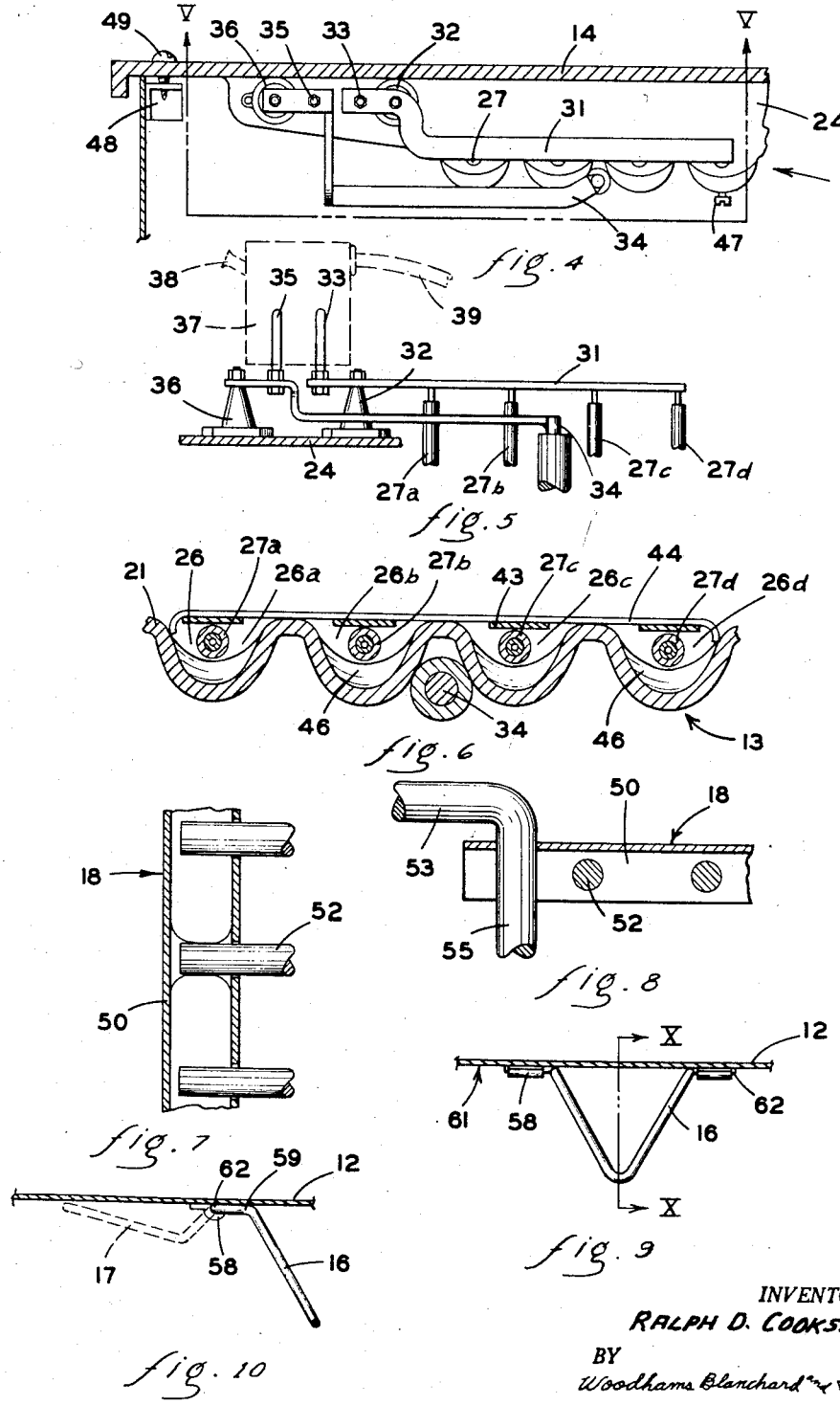
INVENTOR.
RALPH D. COOKSLEY
BY
Woodhams Blanchard & Flynn
ATTORNEYS United States Patent Office
2,874,631
Patented Feb. 24, 1959

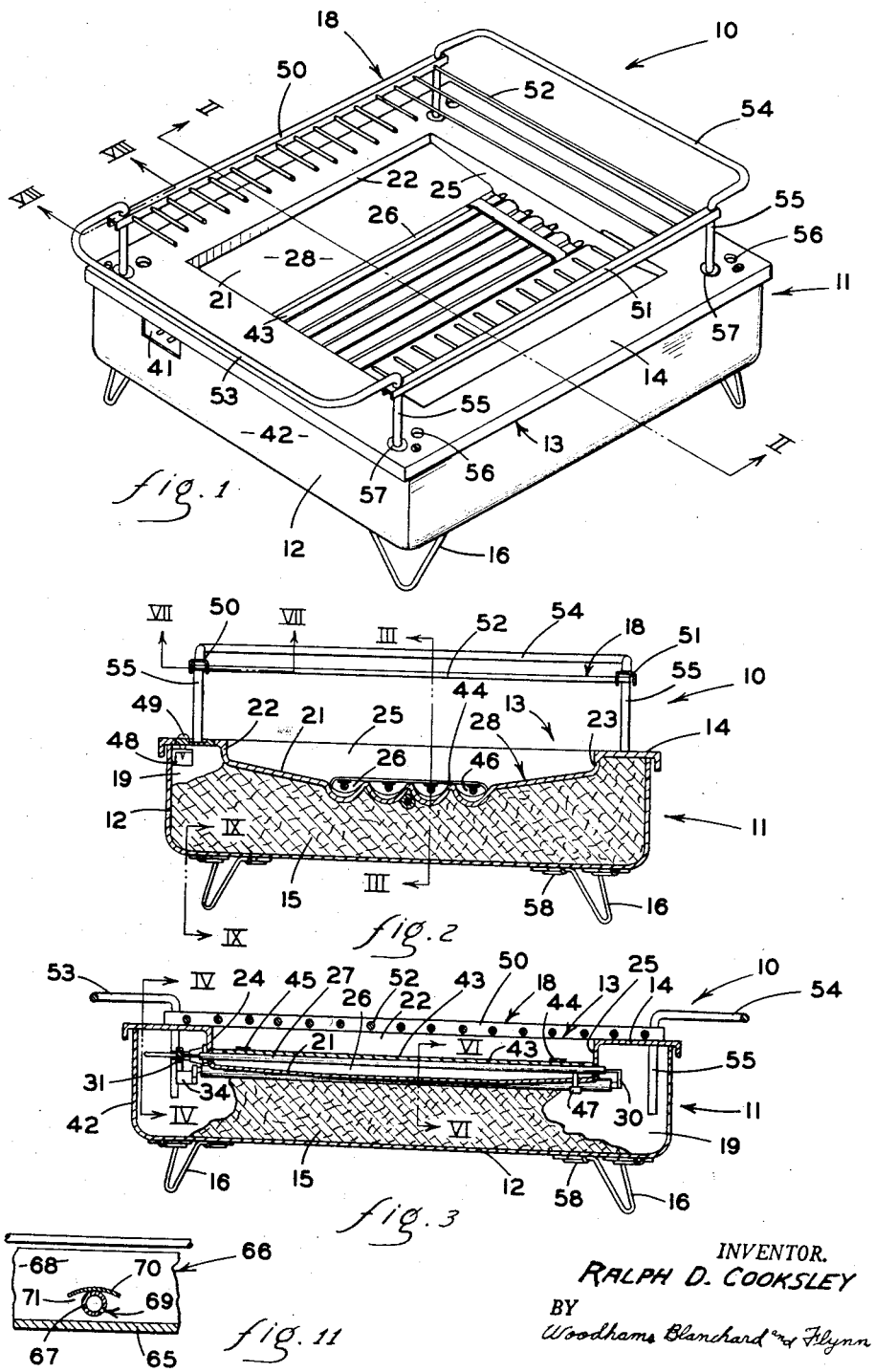

2,874,631
CHARCOALER
Ralph D. Cooksley, Kalamazoo, Mich.
Application February 14, 1956, Serial No. 565,495
6 Claims. (Cl. 99—400)

This invention relates to a cooking device and it relates especially to such a device which is particularly adapted to the broiling, cooking or charcoaling of various kinds of fat containing or fat carrying foods, such as a fat containing meat or a non-fat containing food to which a fat containing material has been applied.

Since the principles employed by the present invention are applicable to the preparation of many types of fat containing foods, or foods to which fat has been applied, general reference will for convenience be sometimes made hereinafter to all or any of such foods by the term "fat carrying" foods and it will be understood that the fat in question may be of either animal or vegetable origin. However, these principles have been particularly worked out in connection with steaks and are well illustrated by the cooking of steaks and, accordingly, the following discussion will, for illustrative purposes, be carried out primarily with reference to the preparation of steaks with the understanding that this is for illustrative purposes only and is not limiting.

In the conventional cooking of steaks, the preparation thereof over charcoal has been commonly and widely accepted as producing steaks of exceptional taste and savoriness. This has had sufficient popular appeal that the so-called charcoal broiling of steaks has been popularly practiced on both a commercial and amateur basis in spite of the inconvenience, dirtiness, expense and time consuming characteristics of the handling of charcoal. These disadvantages of using charcoal have been well recognized and many objections have been made to them. Nevertheless, they have been accepted in the belief that they were essential to the enjoyment of the flavor obtained from charcoal broiled steaks, although many attempts have been made to minimize these inconveniences without impairing the advantages of this general method of preparing steaks.

However, I have discovered that a very large part, possibly all, of the distinctive flavor of charcoal broiled steaks does not originate from the charcoal itself, excepting as said charcoal may be producing smoke which is undesirable in itself, but is rather obtained from the flame produced when the fatty substances within or on the meat itself drip onto the hot coals and flash back onto the meat. Thus, by providing an electrically or gas heated steak grilling device adapted for vaporizing such dripping fat and then igniting the vapor, I have been able to produce steaks whose taste is indistinguishable from the steaks broiled over charcoal heat. This, then, makes it possible to produce steaks having all the flavor and savoriness of conventionally charcoal broiled steaks without the delay, dirt and inconvenience which is essential with conventional charcoal operations and which can, accordingly, be carried out correspondingly quickly and easily. Further, with my device it is feasible to broil steaks in a charcoal manner anywhere within a home where fumes can be readily removed, such as within a living room fireplace or on a patio and to do so quickly, easily and cleanly. Other advantages not possible for charcoal burning devices are also possible with my device and will be discussed in detail hereinafter.

Further, the desirable flavor of charcoal broiled steaks can be even further accentuated by dipping the steak, prior to cooking, in a fat containing mixture, which may also contain flavoring, if desired, prior to placing it on the grill. This will provide an ample source of fat to drip into the vaporizing zone and flame back against the steak and thereby provide an even greater charcoaling effect than is conventional in normal practice.

Accordingly, a major object of the invention has been to provide a device for cooking fat carrying foods over an electric or gas produced source of heat in such a manner as to produce a finished product whose taste is substantially indistinguishable from the taste obtained when such food is prepared over charcoal heat.

A further object of the invention has been to provide a device, as aforesaid, which will receive fatty substances dripping from the food, vaporize same, ignite the vapor and permit the flame resulting therefrom to play back against the food being prepared.

A further object of the invention is to provide a device, as aforesaid, which will be clean to use and which will be rapid in its operation.

A further object of the invention is to provide a device, as aforesaid, which is readily adaptable for use either on an amateur basis or on a commercial basis and which can be used readily either outdoors or within a home at any point where vapors can be carried off, such as in a fireplace or adjacent to a kitchen type exhaust fan.

A further object of the invention is to provide a device, as aforesaid, which will be relatively inexpensive to manufacture and distribute.

A further object of the invention has been to provide a device, as aforesaid, which will be easy to operate, easy to keep clean and which will require relatively little, if any, maintenance.

A further object of the invention has been to provide a device, as aforesaid, which will be versatile in its area of use whereby it will be applicable to the preparation of a wide variety of different types of foods, although it is particularly adapted as above set forth to use with those foods containing or carrying fatty substances, said fatty substances being of either animal or vegetable origin.

A further object of the invention has been to provide a device, as aforesaid, which in operation can be used in a manner identical with the normal handling of steaks with conventional charcoal.

A further object of the invention has been to provide a device, as aforesaid, which will operate in a manner as effective as conventional charcoal but utilizing a source of energy which is much less expensive than charcoal.

A further object of the invention is to provide a device, as aforesaid, which can be made largely from commercially available components and which accordingly can be made for distribution at a relatively low price.

A further object of the invention is to provide a device, as aforesaid, which will be sturdy and capable of withstanding long and rugged use without requiring appreciable maintenance.

A further object of the invention has been to provide a device, as aforesaid, which will be easy to clean and keep clean.

Other objects and purposes of the invention will be apparent to persons acquainted with apparatus of this general type upon reading the following disclosure and inspecting the accompanying drawings, in which:

Figure 1 is an oblique view of the cooking device to which this invention relates, with the grill thereof in the raised position.

Figure 2 is a sectional view taken along the line II—II of Figure 1.

Figure 3 is a sectional view taken along the line III—III of Figure 2, with the grill in the lowered position.

Figure 4 is a sectional view taken along the line IV—IV of Figure 3.

Figure 5 is a sectional view taken along the line V—V of Figure 4.

Figure 6 is a sectional view taken along the line VI—VI of Figure 3.

Figure 7 is a sectional view taken along the line VII—VII of Figure 2.

Figure 8 is a sectional view taken along the line VIII—VIII of Figure 1.

Figure 9 is a sectional view taken along the line IX—IX of Figure 2.

Figure 10 is a sectional view taken along the line X—X of Figure 9.

Figure 11 is a fragmentary, section view similar to that of Figure 6 showing an alternate structure.

GENERAL DESCRIPTION

In general, I have met the objects above set forth by providing a device having a food supporting grill structure positioned above a plurality of heating elements, which elements may be of any of several types, including both gas fired or electric. Said elements are spaced laterally from each other a short distance and are preferably in parallel rows. A shield is provided over each element to prevent the dripping of fat directly on the element. A vaporizing zone is provided below and partially around each element to catch fatty materials dripping from the food on the grill, to vaporize such materials and ignite said vapor immediately upon its forming.

The use of either gas or electric energy in place of charcoal as the source of heat supply will save enough cost normally to pay for the device in a relatively brief time.

Uniform spacing of the heating elements from the food being cooked will enable a user within a relatively short period of use to secure extremely uniform results not subject to the variations in heating which are a normal result of the use of charcoal.

The actual charcoaling being brought about by the flame resulting from the burning of vaporized fatty material, it becomes possible by adjusting the amount of such fatty material on the food being cooked to adjust the amount of charcoaling desired with relation to the degree to which the meat is cooked. Thus, a steak may be heavily charcoaled but lightly cooked or vice versa, as desired.

Since the burning, vaporized fat will diffuse throughout the space immediately under the meat, the charcoaling effect produced thereby will be relatively uniform without other particular attention on the part of the operator.

The grill may be readily designed in such a manner that it can support aluminum foil in order, following conventional practice with charcoal, to cook steaks, or other food, without the formation of charcoal thereon as preferred. Further, the grill may also be arranged to be capable of elevation away from the heating elements in order to keep the food warm over an extended period of time without appreciable further cooking thereof. Similarly, auxiliary equipment may be readily used with the device of my invention in order that the electrical or gas energy supplied to the heating elements may be varied thereby, if desired, to control the heat level.

*Detailed construction*

As shown in Figures 1, 2 and 3, the cooking device 10 is comprised of a double-walled, upwardly opening, receptacle 11, having an outer casing 12 and an inner container or liner 13, which, in this particular embodiment, has an outwardly extending, flanged rim 14 which rests upon the upper edge of the outer casing 12. Appropriate insulation 15, of any conventional type, may be placed within the space 19 between the casing 12 and the liner 13 to keep the casing cool when the device is operating. The casing 12 is preferably supported upon legs 16, which in this case are foldable from an extended position, as shown in Figure 3, to a collapsed position as shown in broken lines at 17 in Figure 10. A grill 18 is mountable upon the rim 14, as shown in Figure 1. Although the receptacle 11 and the grill 18 are substantially rectangular in this particular embodiment it will be recognized that other shapes and contours may be used without deviating from the scope of the invention.

The liner or inner container 13 (Figures 1, 2 and 3) of the receptacle 11 is preferably, but not necessarily, cast with the flanged rim 14 as an integral part thereof. Said liner 13 has a substantially rectangular bottom 21, a pair of opposed side walls 22 and 23, and a pair of end walls 24 and 25. The upper surface 28 of the bottom 21 slopes downwardly from the side walls 22 and 23 at a relatively slight pitch. A plurality of parallel recesses 26, here four in number and labeled as "26a, 26b, 26c and 26d" (Figures 2 and 6) are provided in said upper surface 28 of the bottom 21 between, parallel with, and preferably spaced from, the side walls 22 and 23. Said recesses 26 extend from one end wall 24 to the other 25 of the liner 13. The recesses 26, as best shown in Figure 3, are sloped downwardly toward their centers from their ends. Thus, any materials, such as fats or other drippings from food placed on the grill 18, will tend to move by gravity along the upper surface of the bottom 21 toward the center portions of the recesses 26, for reasons appearing hereinafter.

As shown in Figure 6, the four recesses 26 are grouped rather closely together and a heating element 27 is disposed within, and spaced from the walls of, each said recess 26. Here, the heating elements 27, individually indicated as 27a, 27b, 27c and 27d, are comprised of electrically energized resistance-type heating elements. The opposite ends of each of said heating elements 27 extend through the end walls 24 and 25 of the liner 13 into the insulating space 19 between the liner 13 and the casing 12. Said heating elements 27 may be of any conventional type, such as those known commercially as "Calrod" and manufactured by the General Electric Company.

The heating elements 27 are each electrically connected at one end to the rear bus bar 30, and are connected together at their other ends by the front bus bar 31 (Figures 3, 4 and 5). The front bus bar 31 is, in turn, mounted near one end upon an insulator 32 and supports a terminal rod 33 near said one end thereof. The rear bus bar 30 is connected by means of an insulated conductor 34 to a terminal rod 35 located adjacent to the terminal 33 and supported by means of an insulator 36. The terminals 33 and 35 (Figure 5) are connectible to a plug 37 having a manual switch 38 and connected, as by the conduit 39, to a source of electrical energy. The connector 37 extends through a suitable opening 41 (Figure 1) in one end wall 42 of the casing 12 for the purpose of removably engaging the terminals 33 and 35. The insulators 32 and 36 are mounted, as by bolts, upon the outer surface of the end wall 24 of the container 13.

Brackets 48 (Figures 2 and 4) are secured to the inside wall of said casing in each of the four corners thereof. Said brackets each have openings therethrough which are alignable with openings in said rim 14 adjacent to the corners thereof. Suitable bolts or screws 49 are received through the openings in said rim for threaded engagement with the openings in said brackets for securing said liner 13 with respect to, and upon, the casing 12.

As illustrated particularly in Figures 3 and 6, each heating element 27 has the upper surface thereof covered by an elongated hood member 43, which extends substantially from one end of the recess 26 to the other end thereof. Said hood members 43 are connected together and held against accidental lateral movement with respect to the heating elements 27 by means of a pair of cross bars 44 and 45. Said cross bars are turned downwardly at their opposite ends for the purpose of engaging the adjacent, outside walls of the outer two recesses 26a and 26d, as shown in Figure 6. Thus, the hood members 43 can be quickly and easily removed upwardly as a unit from within the liner 13. The hood members 43 may rest upon the upper surfaces of their respective heating elements 27, or may be spaced slightly thereabove, if desired. In each instance, said hood members 43 combine with the side and bottom walls of their respective recesses for the purpose of defining vapor zones 46, which substantially surround the heating elements 27. Thus, the fatty material which drips or flows into the recesses 26 is vaporized in the zones 46 before it is ignited by the heating elements 27 in a manner discussed in detail hereinafter. Also, said hood members prevent the fatty materials from dripping directly upon the heating elements 27 where they would become carbonized and thereby develop a carbon coating on the elements. Such a coating not only quickly reduces the heating efficiency, but will also eventually burn out the heating element by preventing the radiation of the heat which it develops.

Screws 47 are provided through and threadedly engage the bottom walls of one or more of said heating elements 27 (Figures 3 and 4) for the purpose of preventing movement of the heating elements 27, unless so desired. Since the heating elements 27 are all interconnected by the bus bars 30 and 31, such securement of one or two of said heating elements by the screws 47 effectively locks all of said elements in place. The upper surfaces of the hood members 43 are preferably flush with the upper surface 28 of the bottom wall 21 between the recesses 26, as shown in Figure 6.

A grill 18, which may be substantially conventional in appearance, is provided for supporting the food upon, and above, the container or liner 13, as shown in Figures 1 and 3. Said grill 18 has a pair of lengthwise, channel-shaped bars 50 and 51, which open downwardly and are preferably parallel with each other. A plurality of parallel cross rods 52 extend between, and are supported upon, the adjacent flanges of said bars 50 and 51, as shown in Figures 7 and 8. The end and center cross rods 52 may be welded in position, as indicated in Figure 7, for the purpose of giving the entire grill added rigidity. The remainder of said rods 52 may be rotatably supported upon said channel bars 50 and 51 for facilitating movement of food upon said grill and easing the problem of cleaning of said rods. The adjacent ends of said bars 50 and 51 are connected by outwardly extending handles 53 and 54, which may be welded, or pressed, to said channel bars 50 and 51. The inner ends of said handles are bent downwardly at right angles (Figure 8) to provide co-extensive, substantially parallel support posts 55, which extend through appropriate openings in the webs of said channel bars near their ends. Openings 56 are provided in the rim 14 through which said posts 55 may slidably extend, thereby permitting the grill 18 to rest upon the rim 14, as shown in Figure 3.

The rim 14 on the container 13 also contains depressions 57, arranged on said rim in a pattern substantially identical to the pattern of the openings 56. Thus, when the grill 18 is mounted upon the rim 14 in the raised position (Figures 1 and 2) with the support posts 55 resting in the depressions 57, accidental lateral displacement of the grill 18 is prevented.

The receptacle 11 is mounted upon legs 16 (Figures 9 and 10) each of which have a pair of pivot portions 62 pivotally secured to the bottom of the casing 12 by means of pivot straps 58. Said legs 16 are, in this particular embodiment, V-shaped and have shoulders 59 adjacent to the pivot portions 62 for engagement with the lower surface 61 of said casing 12 when said legs 16 are in their extended position, as shown in Figure 10. The legs 16 may be retracted or folded into their broken line position 17 (Figure 10) quickly and easily by pivotal movement about the coaxial portions 62 thereof.

In cases where it is desirable to provide a combustible gas as the source of heat, in place of electrical energy, as disclosed hereinabove in the principal form of the invention, a modification of the structure, such as that indicated in Figure 11, may be provided. Here, the upper surface of the bottom wall 65 of the container or liner 66 is smooth and is not provided with recesses, even though it preferably slopes downwardly toward the center thereof, as in the case of the upper surface of the bottom wall 21. A plurality of tubes 67 extend between the end walls, one of which is shown at 68 in Figure 11, and are provided with downwardly opening jets or ports 69 through which the combustible gas flowing into and through the tubes 67 may be expelled. A hood 70, which is preferable concave on its lower surface, is placed over, and may be secured to, the upper surface of each tube 67 (Figure 11) for substantially the same purpose served by the hood member 43 in the principal form of the invention, as shown in Figure 6. A vapor zone 71 is created by and between the lower surface of the hood member 70 and the adjacent portion of the bottom wall 65 thereunder. Suitable, conventional means of controlling the flow of the combustible gas to the tubes 67 may be provided in any conventional manner and, therefore, is not disclosed herein.

*Operation*

As has been indicated in substance by the above detailed description of the construction of my invention, the cooking device 10 is made ready for operation simply by engaging the terminals 33 and 35 with a plug 37, which is in turn connected by means, such as the cable 39, to a suitable source of electrical energy. A switch 38 provides a convenient, local means of controlling such flow of current, but is not essential to the invention. Food to be cooked, either with or without additional fatty materials added thereto, is placed upon the cross rods 52 of the grill 18, either while the grill is mounted upon the rim 14 of the container 13, or while said grill is in some other location. For normal cooking or broiling, the grill is lowered into its Figure 3 position simply by inserting the support posts 55 into the corresponding openings 56 in said rim 14. It has been found by experiment that four heating elements 27, which are approximately 16 inches long, will not overload a normal 110 volt, 15 ampere, house circuit, while providing ample heat for cooking steaks or other foods placed upon the grill 18. As the foods on said grill are being cooked, the juices from said foods will drop into the container 13 and flow toward the center portions of the recesses 26. The heating elements 27 tend to reach their greatest heat in their center portions. Thus, the materials which flow into the recesses will tend to vaporize first, due to the radiated heat from said heating elements 27, after which the vaporized materials are ignited and flame upwardly toward the grill 18 and foods supported thereby. This process of vaporization, flaming and its resultant, favorable effect upon the flavor of the foods being cooked upon the grill, will continue until the foods are properly cooked, as desired or required.

The hood members 43, or their alternate forms 70 in the gas heated device (Figure 11) serve a dual purpose. First, they protect the heating elements from direct contact with the unvaporized fats and other materials dropped from the cooking foods, thereby preventing the formation of carbon on said heating elements. Secondly, they provide a cover for the vaporization zones 46 and 71 adjacent to the elements 27 and the heating tubes 67, respectively. Sufficient space is left between the hood members 43, for example, and the side walls of the recesses 26 to permit flow of fatty materials into said recesses and to permit the upward escape of the vapors from said recesses. The food supported by the grill 18 is cooked, as desired or required, and said grill is then easily and quickly raised by manually engaging the handles 53 and 54 and lifting them until the support posts 55 are released from their engagement with the openings 56 in the rim 14. The grill 18 is then rested upon the rim 14, with the posts 55 disposed within their corresponding depressions 57 in said rim 14. In such position, the foods on the grill 18 may be kept warm without material, additional cooking.

When use of the cooking device 10 has been completed, the source of energy may be disconnected from the heating elements 27 either by operating the switch 38 or removing the plug 37 from the terminals 33 and 35. The device 10 may be easily and quickly cleaned by removing the grill 18 and the interconnected hood members 43. The liner or container 13 and parts associated therewith may be removed from the remainder of the receptacle 11, including the insulation 15 and outer casing 12, simply by removing the bolts 49 from their engagement with the brackets 48 mounted on the casing 12. The cooking device 10 may be arranged in a compact condition, as for storing or shipping, by inserting the support posts 55 of the grill 18 into their respective openings 56 and collapsing the legs 16 into their broken line position 17, as shown in Figure 10.

Where a combustible gas is used as the heating medium (Figure 11), the jets 69 are preferably directed downwardly so that the flame and heat coming therefrom will be forced to move up through the entire space above the bottom wall 65. Thus, as shown in Figure 11, the flame emitted from the jet 69 will pass upwardly around the lateral edges of the hood 70, and, in so doing, will sweep across the upper surface of the bottom wall 65, thereby igniting any fatty material which vaporizes in that area and otherwise comes in contact with said flame.

Although particular, preferred embodiments of my invention have been described hereinabove for illustrative purposes, it will be understood that variations thereof which lie within the scope of such invention are fully contemplated unless specifically stated to the contrary in the appended claims.

I claim:

1. A food cooking device, comprising: an upwardly opening receptacle having support means and a bottom wall; a plurality of elongated, substantially parallel recesses in the upper surface of said bottom wall; a plurality of elongated heating elements, one being disposed within, and spaced from, the side and bottom walls of each said recess; a plurality of elongated hood members, each of said hood members substantially covering the upper surface of each said heating element, said hood members being spaced from, and cooperating with, the walls of said recesses to form a vaporizing zone adjacent each said heating element; and a food supporting platform mounted upon said receptacle above said hood members.

2. The structure of claim 1 wherein the bottom wall of each said recess is sloped downwardly toward the center thereof near both ends thereof, and said hood members are interconnected by a plurality of cross bars having downwardly extending portions removably engageable with the remote sidewalls of two of said recesses.

3. The structure of claim 1 wherein said platform is flat, provided with openings therethrough and substantially covers said receptacle, and said platform is mounted upon a plurality of parallel posts, which are receivable into corresponding openings in said receptacle.

4. The structure of claim 1 wherein said platform is a substantially rectangular, flat grill having a plurality of parallel posts extending downwardly therefrom, said receptacle has a flat rim along its upper edge containing a plurality of openings into which said posts are slidably receivable, and said rim has a plurality of recesses into which said posts are also receivable, said grill being spaced upwardly from said rim when said posts are in said recesses and being adjacent to said rim when said posts are in said openings.

5. The structure of claim 1 wherein said platform comprises a pair of parallel, downwardly opening channels having a plurality of aligned openings through their adjacent flanges and each channel having a pair of openings through its web near the opposite ends thereof, a plurality of parallel rods extending between said channels and rotatably disposed within said aligned openings, and a pair of U-shaped handles, the end portions of each being bent at right angles to form support posts for said platform which extend through the openings in said webs and are secured to said channels.

6. A food cooking device comprising: an upwardly opening receptacle having a rectangular bottom wall and relatively short side walls, said bottom wall having an upper surface sloped downwardly toward the center thereof; insulating means surrounding said side and bottom walls; a plurality of elongated, parallel and spaced recesses in said upper surface of said bottom wall; a plurality of elongated heating elements, one being disposed within each said recess, said elements being parallel with, and spaced from, the side and bottom walls of said recesses and extending through opposite side walls of said receptacle; a plurality of substantially flat, hood members extending along, and shielding, the upper surface of said heating elements, said members being laterally spaced from each other and from said side and bottom walls of said recess to form vapor zones around said elements; a pair of bus bars interconnecting the respective, adjacent ends of said elements and a pair of terminals connected, respectively, to said bus bars; a grill and means supporting said grill above said hood members and over said bottom wall.

References Cited in the file of this patent

UNITED STATES PATENTS

| | | |
|---|---|---|
| 619,314 | Jones | Feb. 14, 1899 |
| 1,043,667 | Carpenter | Nov. 5, 1912 |
| 1,263,331 | Lindroth | Apr. 16, 1918 |
| 1,542,867 | Fisher | June 23, 1925 |
| 1,591,291 | Detwiler | July 6, 1926 |
| 2,026,797 | Pierson | Jan. 7, 1936 |
| 2,253,834 | Volks | Aug. 26, 1941 |
| 2,417,266 | Petrakakis | Mar. 11, 1947 |
| 2,450,563 | Rommel | Oct. 5, 1948 |

FOREIGN PATENTS

| | | |
|---|---|---|
| 120,426 | Great Britain | Nov. 7, 1918 |